United States Patent
Madan et al.

(10) Patent No.: US 7,516,196 B1
(45) Date of Patent: Apr. 7, 2009

(54) SYSTEM AND METHOD FOR DELIVERY AND UPDATING OF REAL-TIME DATA

(75) Inventors: Hemant Madan, Espoo (FI); Mikko Mäkipää, Helsinki (FI); Oleg Beletski, Helsinki (FI)

(73) Assignee: Nokia Corp. (FI)

( * ) Notice: Subject to any disclaimer, the term of this patent is extended or adjusted under 35 U.S.C. 154(b) by 0 days.

(21) Appl. No.: 09/531,534

(22) Filed: Mar. 21, 2000

(51) Int. Cl.
*G06F 15/16* (2006.01)

(52) U.S. Cl. .................... 709/219; 709/228

(58) Field of Classification Search ........... 707/204; 709/207, 224, 217, 246, 203, 219, 227, 228; 345/760, 864
See application file for complete search history.

(56) References Cited

U.S. PATENT DOCUMENTS

| | | | | | |
|---|---|---|---|---|---|
| 5,398,021 | A | * | 3/1995 | Moore | 340/825.27 |
| 5,404,488 | A | * | 4/1995 | Kerrigan et al. | 711/133 |
| 5,793,497 | A | * | 8/1998 | Funk | 358/402 |
| 5,805,155 | A | | 9/1998 | Allibhoy | |
| 6,035,287 | A | * | 3/2000 | Stallaert et al. | 705/37 |
| 6,073,075 | A | * | 6/2000 | Kondou et al. | 701/203 |
| 6,082,500 | A | * | 7/2000 | Amo et al. | 187/391 |
| 6,173,316 | B1 | * | 1/2001 | De Boor et al. | 709/218 |
| 6,209,026 | B1 | * | 3/2001 | Ran et al. | 709/218 |
| 6,292,743 | B1 | * | 9/2001 | Pu et al. | 701/202 |
| 6,356,287 | B1 | * | 3/2002 | Ruberry et al. | 345/864 |
| 6,377,210 | B1 | * | 4/2002 | Moore | 342/357.13 |

(Continued)

FOREIGN PATENT DOCUMENTS

KR 2004012660 A * 2/2004

(Continued)

OTHER PUBLICATIONS

Cah Södergård et al. "Computer Networks", The International Journal of Computer and Telecommunications Networking, pp. 1111-1128, 1999.

*Primary Examiner*—Douglas B Blair
(74) *Attorney, Agent, or Firm*—Banner & Witcoff, Ltd.

(57) ABSTRACT

A system, method and computer program for receiving real-time data from a content provider and delivering it to a user terminal while using the minimum amount of communication bandwidth possible. This real-time data may take the form of any frequently changing data such as stock prices. The user logs on the system and specifies a portfolio or stocks he is interested viewing. The user may also select active keys which are to be continuously observed. Upon receipt of the real-time data from the content provider, the system, method and computer program determine whether the real-time data has changed from the last update. If no changes have occurred to the real-time data values or the real-time data is not associated the currently active keys then there is no real-time data downloaded to the user. Only if there is a change in real-time data values associated with active currently active keys will the real-time data be transmitted to the user terminal. Further, this system, method and computer program may communicate to any possible user terminal no matter what size screen since the position of each changed real-time data value is specified based on screen size the user terminal is using. Therefore, a user may monitor continuously changing real-time data values while using a mobile device such as a digital cellular phone.

23 Claims, 12 Drawing Sheets

U.S. PATENT DOCUMENTS

| | | | |
|---|---|---|---|
| 6,434,479 B1 * | 8/2002 | Kondou et al. | 701/203 |
| 6,438,585 B2 * | 8/2002 | Mousseau et al. | 709/206 |
| 6,446,096 B1 * | 9/2002 | Holland et al. | 715/513 |
| 6,505,123 B1 * | 1/2003 | Root et al. | 702/3 |
| 6,536,041 B1 * | 3/2003 | Knudson et al. | 725/39 |
| 6,564,250 B1 * | 5/2003 | Nguyen | 709/208 |
| 6,571,279 B1 * | 5/2003 | Herz et al. | 709/208 |
| 6,600,725 B1 * | 7/2003 | Roy | 370/261 |
| 6,727,930 B2 * | 4/2004 | Currans et al. | 345/864 |
| 6,850,906 B1 * | 2/2005 | Chadha et al. | 705/36 R |
| 6,941,338 B1 * | 9/2005 | Madsen | 709/203 |
| 6,952,716 B1 * | 10/2005 | Robb et al. | 709/205 |
| 7,047,417 B2 * | 5/2006 | Leskuski et al. | 713/182 |
| 7,065,388 B2 * | 6/2006 | Minear et al. | 455/566 |
| 2007/0094418 A1 * | 4/2007 | Reisman | 710/1 |
| 2007/0130400 A1 * | 6/2007 | Reisman | 710/62 |
| 2007/0220106 A1 * | 9/2007 | Reisman | 709/217 |
| 2007/0220107 A1 * | 9/2007 | Reisman | 709/217 |

FOREIGN PATENT DOCUMENTS

| | | |
|---|---|---|
| WO | 9935778 | 7/1999 |

* cited by examiner

SYSTEM AND METHOD FOR DELIVERY AND UPDATING OF REAL-TIME DATA

FIELD OF THE INVENTION

The invention relates to a system and method for the delivery and updating of real-time data. More particularly, the invention is a system and method in which a user may obtain real-time data from a supplier or content provider.

BACKGROUND OF THE INVENTION

With the explosion in Internet access and usage individuals have discovered that they may now receive a large amount of information in their homes and offices almost immediately from any number of sources. These sources include everything from the latest news, weather, and sports to stocks, bond and commodity prices. Currently, a typical Internet user would have a browser installed in his local computer or server such as Internet Explorer™ or Netscape™. Using this browser, the user would access an Internet service provider, such as America-On-Line (AOL™), via a modem over the local public switched telephone network (PSTN). Once logged onto the Internet server, the user may utilize one of the many search engines, such as Yahoo™ or Lycos™, to specify search terms. The user may also use a web crawler, spider or robot to attempt to find a product, service or information desired. The search engine or web crawler would then respond with a list of web sites which matched the search terms the user provided. The user would then log onto a web site and view the products or services available for sale or receive the information desired. Further, if the user discovers a web site he prefers, the user may store the universal resource locator (URL) in a favorites' directory for later quick access. Finally, due partly to the availability of the Internet, day trading has become very popular. Day traders will often sit in front a monitor and watch as trades in stocks, bonds, currencies, commodities and options occur on the major markets. These day traders will often make numerous purchases and sales in a given day. However, the ability to monitor the trading on a major market such as the New York Stock Exchange (NYSE) is often difficult for the average user since it entails monitoring trading occurring in hundreds of stocks simultaneously. The volume of information that would have to be received would easily exceed the capability of 56K modem.

To overcome this problem, day traders and others often will turn to broadband cable Internet access such as provided by @Home$^{SM}$ or join a service which has computers set up at a given location that may be used by their members. If a broadband cable Internet service is used, the improvement in throughput can be significant. This improvement in throughput is possible through the use of coax or fiber optic cable. However, the price is also significantly higher than Internet access available through an Internet service provider, such as AOL™, using the local public switched telephone network (PSTN). Further, whether using a trading service or a broadband cable Internet service, the user is often limited to a single site where they can access the desired information.

Recently cellular phone service providers have been making available Wireless Access Protocol (WAP) and Hypertext Markup Language (HTML) capable cellular phones for Internet access wherever digital cellular phone access is available. Using such a WAP-capable phone, a user no longer is tied to a fixed location in order to access the Internet. However, the screen size on such a WAP-capable phone is limited. Further, even when using a palm computer or lap top connected to a cellular phone, the bandwidth is so limited by the cellular phone that receiving real-time information is difficult if not impossible. This is particularly the case when an entire screen must be refreshed when a single piece of information on the screen needs to be changed as would be the case when a HTML refresh tag is used. Still further, there is no known system or method that can display real-time information in a easily readable form and adjust for screens of dramatically varying sizes.

Therefore, what is needed are a system and method in which a user may monitor changing events on a real-time basis on a portable device as well as a stationary device. This system and method should be able to communicate, adjust to and effectively display information any size screen. Further, this system and method should keep data transfer to an absolute minimum so as to use all available bandwidth for the critical real-time data that may change at any given moment. Further, this system and method should require minimum hardware capability in the user portable device so that the size and cost of the user portable device can be kept low.

SUMMARY OF THE INVENTION

An embodiment of the present invention provides for a method of a method of receiving information from a content provider and transmitting the information to a user terminal. This method starts by receiving information from the content provider and then displaying at least a portion of the information on the user terminal. The method then monitors the information from the content provider to determine if any of the portion of the information being displayed on the user terminal has changed. Thereafter, the information from the content provider that has changed is updated and transmitted to the user terminal.

Further, an embodiment of the present invention creates a system and computer program for receiving real-time data values from a content provider and transmitting the real-time data values to a user terminal. This system and computer program has a user terminal to receive real-time data values. It also has a real-time data server code segment to receive real-time data values from a content provider, determine if the real-time data values have changed from prior real-time and transmit the real-time data values to the user terminal when the real-time data values have changed from the prior real-time data values. Further, as well as only those real-time values that have changed are transmitted, only those real-time data values that are currently being displayed on the user terminal are transmitted to the user terminal, thereby keeping the data transfer required to an absolute minimum.

These and other features of this device, method and computer program will become more apparent from the following description when taken in connection with the accompanying drawings which show, for purposes of illustration only, examples in accordance with the present invention.

BRIEF DESCRIPTION OF THE DRAWINGS

The foregoing and a better understanding of the present invention will become apparent from the following detailed description of exemplary embodiments and the claims when read in connection with the accompanying drawings, all forming a part of the disclosure of this invention. While the foregoing and following written and illustrated disclosure focuses on disclosing example embodiments of the invention, it should be understood that the same is by way of illustration and example only and the invention is not limited thereto. The spirit and scope of the present invention are limited only by the terms of the appended claims.

The following represents brief descriptions of the drawings, wherein.

DETAILED DESCRIPTION

Before beginning a detailed description of the subject invention, mention of the following is in order. When appropriate, like reference numerals and characters maybe used to designate identical, corresponding or similar components in differing figure drawings. Further, in the detailed description to follow, exemplary sizes/models/values/ranges may be given, although the present invention is not limited to the same.

Figure 1:
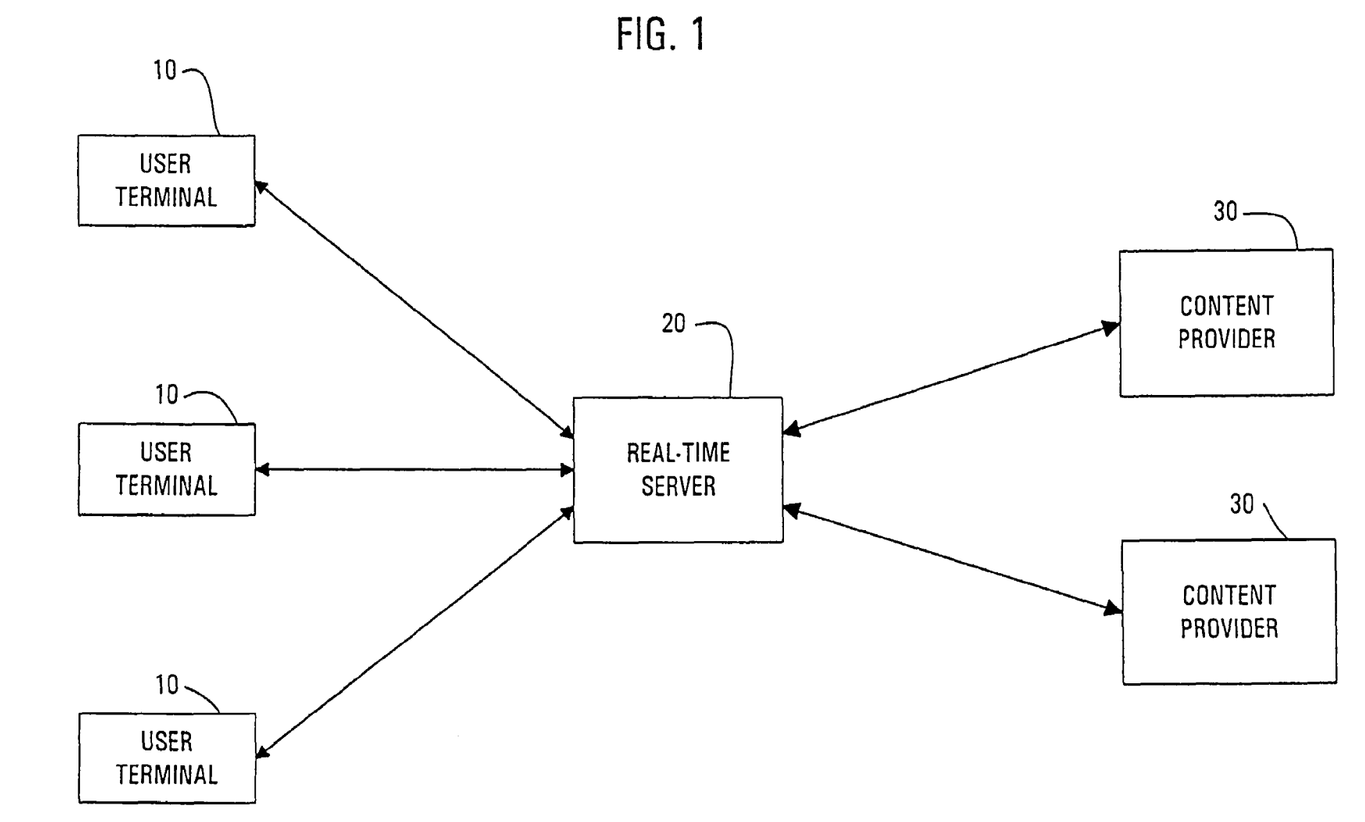
FIG. 1 is an example of an overall system diagram of an embodiment of the present invention.

FIG. 1 is an example of an overall system diagram of an embodiment of the present invention showing the three major components. A user terminal 10 is employed to interface between the user and a real-time server 20. This user terminal 10 may be, but not limited to, WAP-capable cellular telephone, a HTML-capable cellular telephone, or a processor-based system connected to a cellular telephone. This processor-based system may be, but not limited to, a palm computer, lap-top computer or personal computer. Further, the user terminal 10 is not limited to the use of a cellular phone and may also use the public switched telephone network (PSTN) or a satellite telephone or any form of communications lines such as standard twisted pair phone lines, coax cable and fiber optics. These communications lines may be leased lines including: T1 lines capable of transmitting at 1.54 Mbits/sec; T3 lines capable of transmitting at 45 Mbits/sec; E1 lines capable of transmitting at 2.048 Mbits/sec; and E3 lines capable of transmitting at 34 Mbits/sec.

Still referring to FIG. 1, the user terminal 10 communicates to the real-time server 20 which is responsible for delivering real-time data information to the user terminal 10 from a content provider 30. The content provider 30 may be any supplier of real-time information as exemplified by, but not limited to, a stock exchange, commodities market, brokerage firm, currency exchange, news wire service, gaming service, and sport event reporting service. The real-time server 20 is discussed in further detail in reference to FIGS. 2 and 4 through 8. The user terminal 10 is discussed in further detail in reference to FIGS. 3, 9 and 10.

Figure 2:
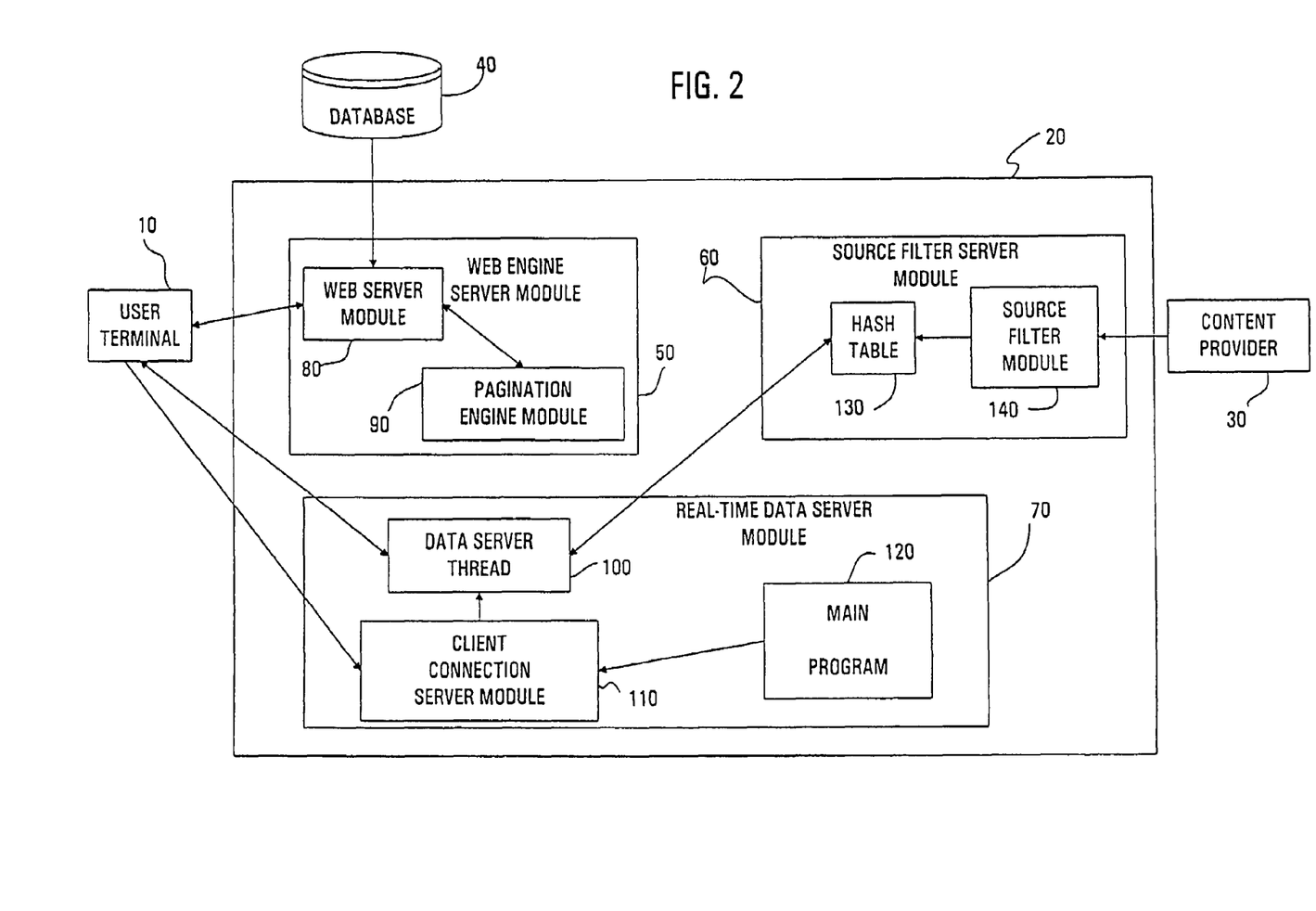
FIG. 2 is an example of a modular configuration diagram illustrating the individual modules contained in the real-time data server 20 shown in FIG. 1.
Figure 3:
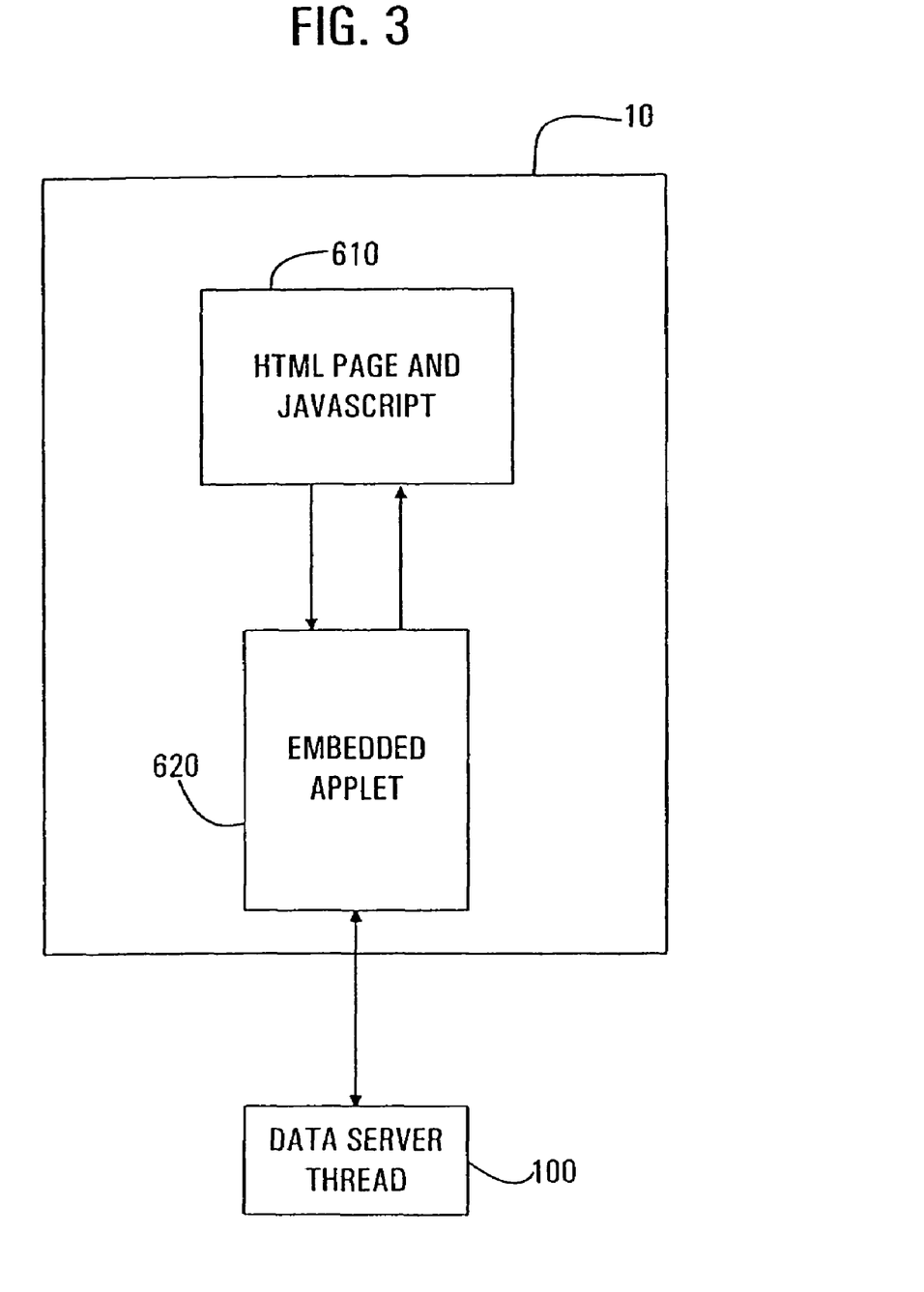
FIG. 3 is an example of a modular configuration diagram illustrating the individual modules contained in the user terminal 10 shown in FIG. 1 and FIG. 2.

The modular configuration diagrams shown in FIGS. 2 and 3 as well as the flowcharts shown in FIGS. 4 through 10 contain software, firmware, processes or operations that correspond, for example, to code, sections of code, instructions, commands, objects, or the like, of a computer program that is embodied, for example, on a storage medium such as floppy disk, CD Rom, EP Rom, RAM, hard disk, etc. Further, the computer program can be written in any language such as, but not limited to, for example Java.

FIG. 2 is an example of a modular configuration diagram illustrating the individual modules contained in the real-time server 20. The real-time server 20 may be implemented as, but not limited to, a Java application running on a Windows NT™ server. However, as would be appreciated by one of ordinary skill in the art, the real-time server 20 may be written in any language equivalent to Java and operate under almost any operating system including, but not limited to, Windows 95, Windows 98, Windows NT™, Windows 2000™, Windows CE™, Linux, and any version and variation of Unix. One of the functions performed by the real-time server 20 is delivery of real-time data to the client terminal 10 from the content provider 30. The real-time server 20 and user terminal 10 serve to deliver to the user or client, data that is fast changing, such as, but not limited to, stock related information, and update it on the user terminal 10 automatically and within the limited and short period of it is available. Further, the embodiments of the present invention are discussed in reference to the receipt and display of stock information. However, any reference to stocks or stock information is only by way of example and is not intended to limit the scope of the present invention as provided by the claims.

The real-time server 20 achieves real-time seamless delivery of stock quote data to the client terminal 10. The user is allowed to create different portfolios and to choose different stocks, or sectors appearing in each portfolio. The user saves this portfolio, for later use, via the real-time server 20 in database 40. This portfolio definition is stored in the user profile information. The user can view the associated data for a stock in different views, the views include a stock information view, news article view, stock intra-day view, and trading information view. Examples of these views are illustrated and discussed in further detail in reference to FIGS. 11 and 12 ahead.

Still referring to FIG. 2, a source filter server module 60 is used to receive real-time data and maintain it for quick access. The source filter server module 60 uses a source filter module 140 and a Hash table 130 to accomplish reception and quick retrieval of real-time data. The source filter module 140 may receive, but not limited to, an XML (Extensible Markup Language) stock feed from the content provider 30 and parses it into a Hash Table 130 which contains the latest values for each stock. A key is associated with each stock entry and used to access the hash table 130. The key allows for direct access to the associated stock data without the requirement of searching or sorting the data. A real-time data server module 70 communicates with the source server filter module 60 using remote method invocation (RMI). RMI is a remote procedure call (RPC), which allows Java objects (software components) stored in the network to be run remotely.

Still referring to FIG. 2, the real-time data server module 70 employees at least three modules including a data server thread 100, a client connection 110 and a main program 120. The client connection server module 110 listens or monitors the ports to the user terminals 10 for incoming connections and launches a dedicated data server thread 100 to serve each connection. Therefore, each user terminal 10 has at least one dedicated data server thread 100. The data server thread 100 uses RMI to monitor data being maintained by the source filter server module 140 in hash table 130. The data server thread 100 registers itself as an observer for keys, based on portfolio selection or other input from the user terminal 10, and is notified when the values change for those keys by the source filter sever module 60. Upon notification of such a change the data server thread 100 retrieves the new data using RMI and if the values are different from the previously known values, sends a packet of data back to the user terminal 10.

Still referring FIG. 2, a web engine server module 50 is used to communicate between the user terminal 10 and the database 40. The web engine server module 50 has at least two components which include a web server module 80 and a pagination engine module 90. The web engine module 50 retrieves paginated HTML pages for the portfolio selected by the user with an embedded applet 620, shown in FIG. 3, that is downloaded to the user terminal 10. The HTML page and JavaScript 610, shown in FIG. 3, is created by the pagination engine module 90 when the user requests a particular portfolio. The HTML page and JavaScript 610 contains the table indicating where the data is to be displayed on the user terminal 10, and contains the embedded applet 620, shown in FIG. 3. Thus, using this table, it is possible to accommodate the data to different size screens on the user terminal 10. The HTML page and JavaScript 610 also contains the initialization parameters for the embedded applet 620 as well the JavaScript code for navigation as well as document object module (DOM) manipulation of the HTML page and JavaScript 610.

FIG. 3 is an example of a modular configuration diagram illustrating the individual modules contained in the user terminal 10, shown in FIG. 1 and FIG. 2. The user terminal 10 includes a HTML Page and JavaScript 610 and an embedded applet 620. The JavaScript portion of the HTML page and JavaScript 610 traps any keyboard event entered by the user and performs basic navigation. If a need exists to change the page, the JavaScript of the HTML page and JavaScript 610 calls the embedded applet 620 to change the page of active keys, and the embedded applet 620 responds with an indication of whether it is possible to do so. The embedded applet 620 transmits to its corresponding data server thread 100 in the real-time data sever module 70, shown in FIG. 2, the new active keys to monitor. The embedded applet 620, on receiving appropriate data from the data server thread 100, changes the displayed data on the user terminal 10 window using a JavaScript method for a document object module (DOM) manipulation.

A detailed discussion will now be supplied for the modules shown in FIG. 2 contained in real-time server 20. As previously mentioned, the flowcharts shown in FIGS. 4 through 10 contain software, firmware, processes or operations that correspond, for example, to code, sections of code, instructions, commands, objects, or the like, of a computer program that is embodied, for example, on a storage medium such as floppy disk, CD Rom, EP Rom, RAM, hard disk, etc.

Figure 4:
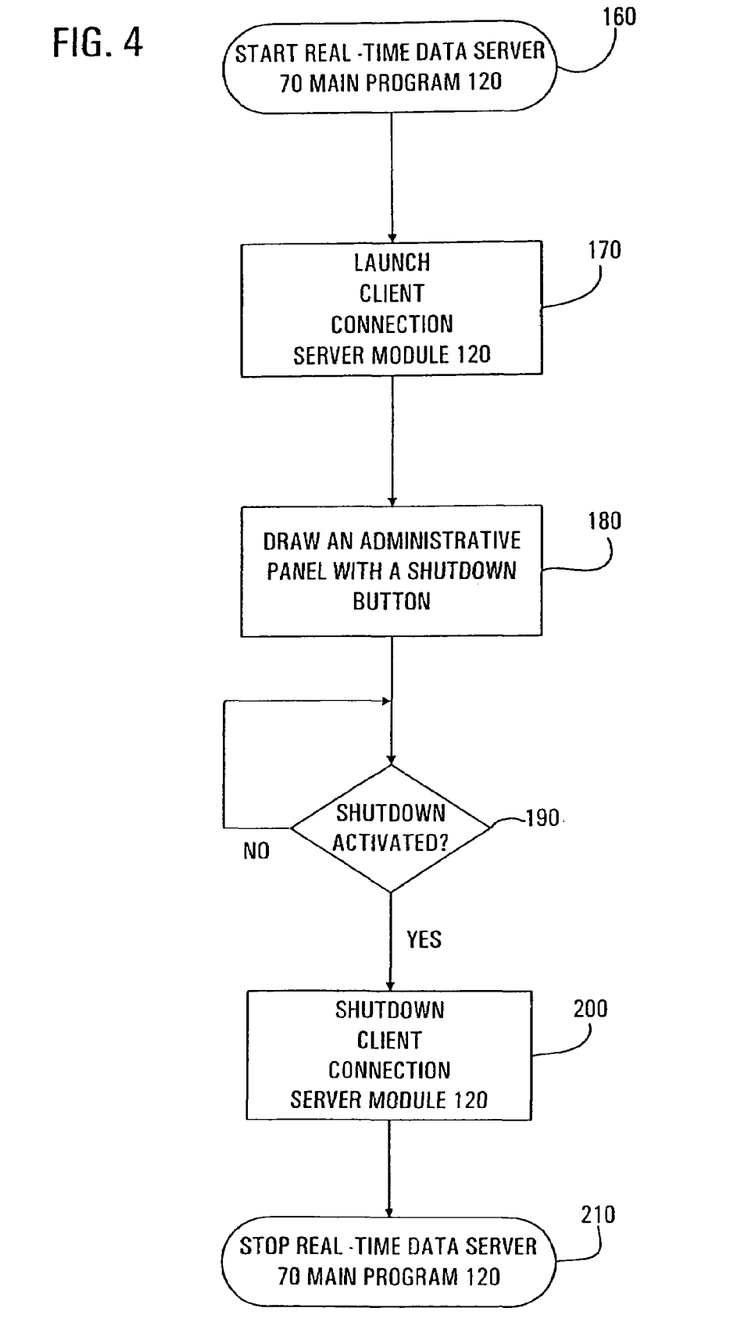
FIG. 4 is an example flowchart illustrating the operations performed by the main program 120 contained in the real-time data server module 70 shown in FIG. 2.

FIG. 4 is an example flowchart illustrating the operations and processes performed by the main program 120 contained in the real-time data server module 70 shown in FIG. 2. The main program 120 begins execution in operation 160 and proceeds to operation 170 at which point in time it launches the client connection server module 110, shown in FIG. 2 and further discussed in reference to FIG. 5. Thereafter, in operation 180, the main program 120 generates an administrative panel or window which allows an administrator to shut down operations in the real-time server 20. In operation 190, a determination is made whether the administrator has engaged the shutdown. If the administrator has not activated the shutdown function then operation 190 is repeated until the administrator does activate the shutdown process. If a shutdown is activated then processing proceeds to operation 200 where the client connection server module 120 is shutdown. Then in operation 210, the main program 120 stops execution.

Figure 5:
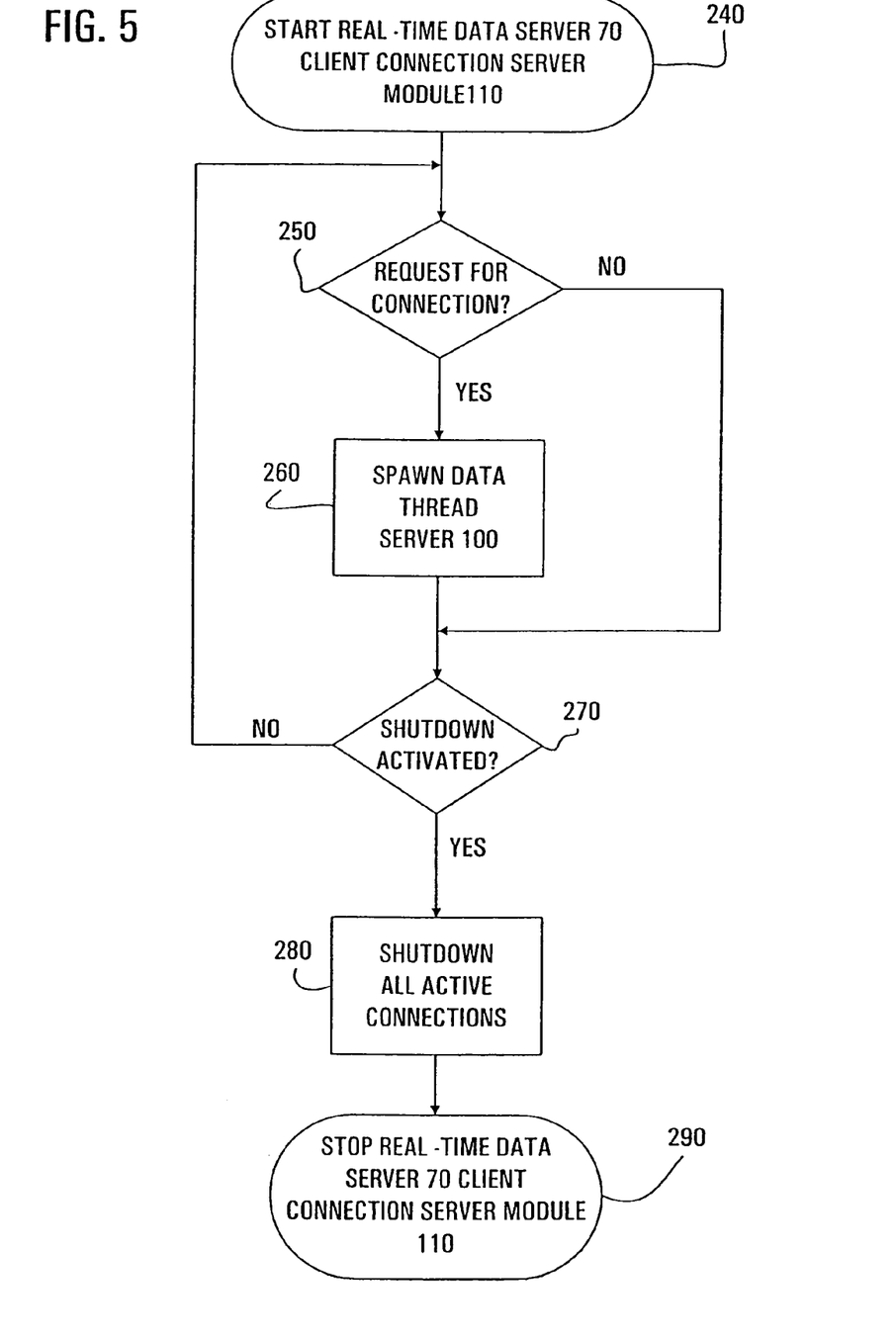
FIG. 5 is an example flowchart illustrating the operations performed by the client connection server module 110 contained in the real-time data server module 70 shown in FIG. 2.

FIG. 5 is an example flowchart illustrating the operations performed by the client connection server module 110 contained in the real-time data server module 70 shown in FIG. 2. The client connection server module 110 is started, in operation 240, by the main program 120 in operation 170 shown in FIG. 170. In operation 250, the client connection server module 110 monitors to determine if a connection request has been received. If no connection request has been received then processing proceeds to operation 270. However, if a connection request has been made then processing proceeds to operation 260 where a data thread server 100 is spawned. Thereafter, processing proceeds to operation 270 where it is determined whether a shutdown processing request has been activated. If no shutdown processing request has been made then processing returns to operation 250 where the processing discussed above is repeated and any additional connections requested are opened until a shutdown request is received. If such a shutdown request is received, then processing proceeds to operation 280 where all active client connections are shutdown. Once all active connections are shutdown in operation 280, then the client connection server module 110 stops execution in operation 290.

Figure 6:
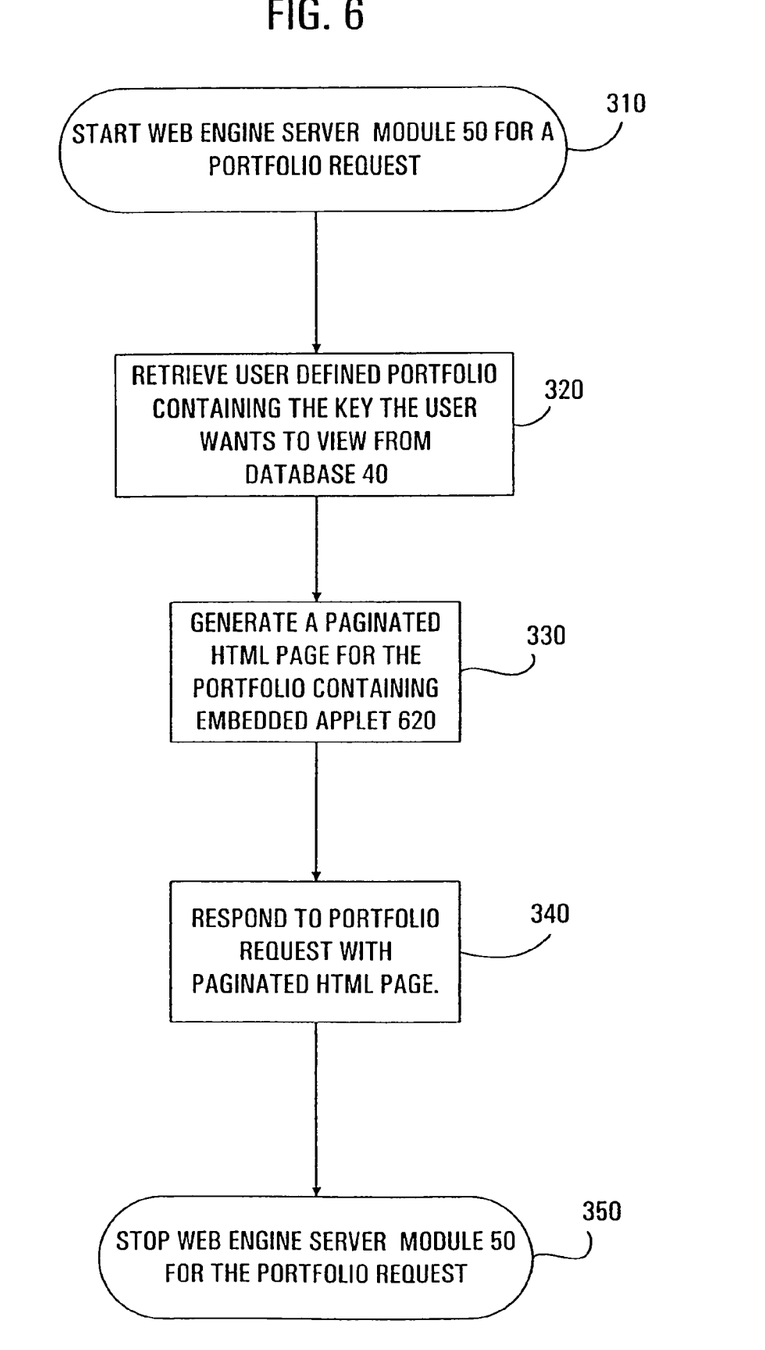
FIG. 6 is an example flowchart illustrating the operations performed by the web engine server module 50 contained in the server 20 shown in FIG. 2.

FIG. 6 is an example flowchart illustrating the operations performed by the web engine server module 50 contained in the server 20 shown in FIG. 2. To summarize the web engine server module 50 fetches a portfolio and returns a paginated portfolio page which has an embedded applet 620. The web engine server module 50 is activated in operation 310 and processing immediately proceeds to operation 320. In operation 320, the user defined portfolio containing the key the user wants to view is retrieved from database 40. Then in operation 330, the pagination engine module 90 generates a paginated HTML and JavaScript 610 for the portfolio containing the embedded applet 620. Processing proceeds to operation 340 where, in response to the portfolio request, a paginated HTML page is transmitted to the user terminal 10. Thereafter, processing of the portfolio request is stopped by terminating execution of the web engine server module 50 in operation 350.

Figure 7:
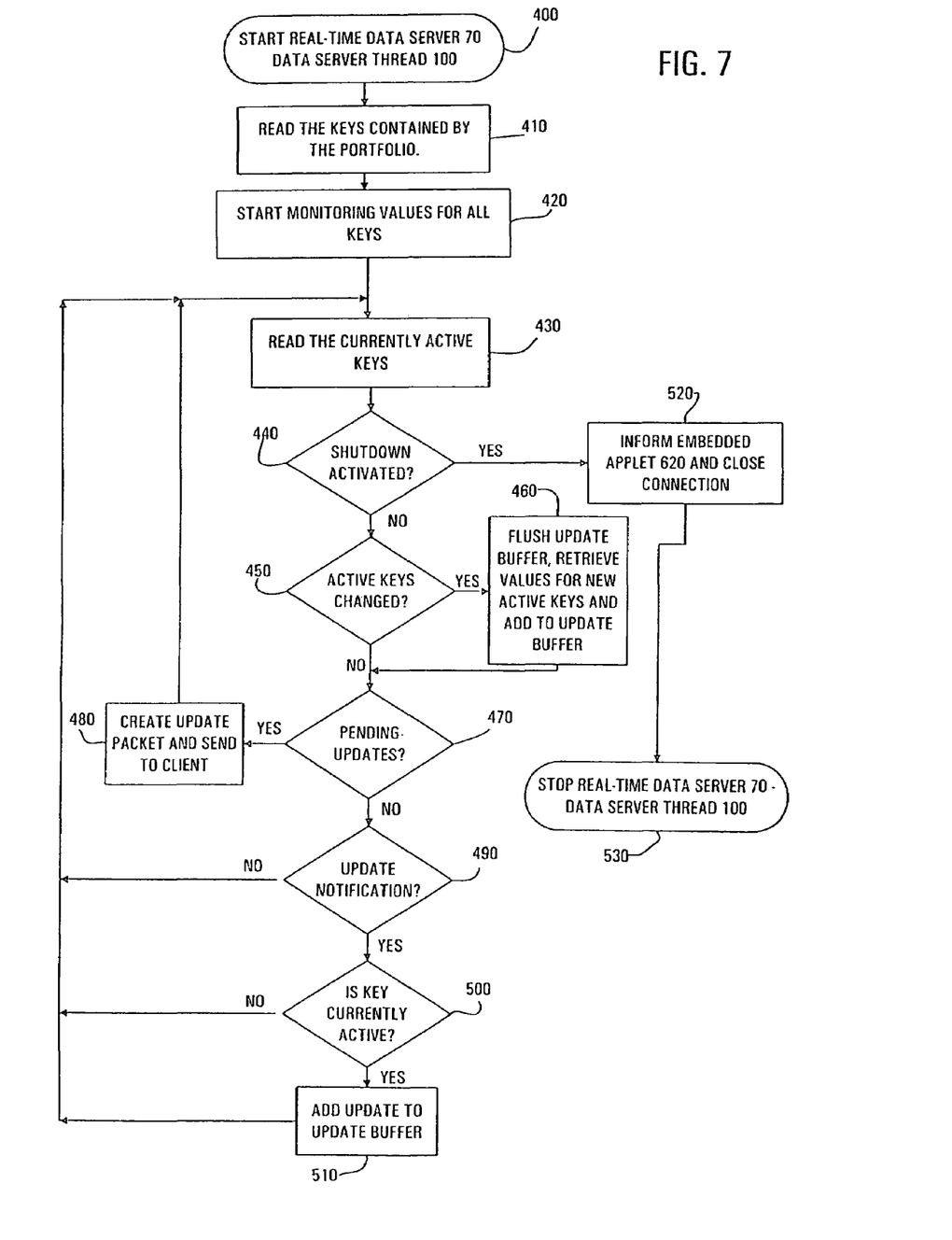
FIG. 7 is an example flowchart illustrating the operations performed by the data server thread 100 contained in the real-time data server module 70 shown in FIG. 2.

FIG. 7 is an example flowchart illustrating the operations performed by the data server thread 100 contained in the real-time data server module 70 shown in FIG. 2. Data thread server 100 begins execution in operation 400 when the client connection server module 110 spawns the data thread in operation 260 as shown in FIG. 5. Then in operation 410, the keys in the portfolio are read by the data server thread 100. In operation 420, the monitoring of the values for all keys is done as previously discussed using an RMI. In operation 430, the currently active keys are received from the user terminal 10. Thereafter, it is determined in operation 440 if a shutdown activation request has occurred. If it is determined in operation 520 that a shutdown has been requested, then processing proceeds to operation 520 where the embedded applet 620 is informed of the shutdown and the connection is closed. Thereafter, if a shutdown was requested, then processing proceeds to operation 530 where the execution of the data server thread 100 is terminated.

Still referring to FIG. 7, if operation 440 determines that a shutdown was not activated then processing proceeds to operation 450 where it is determined if the currently active keys have changed. If the currently active keys have changed, then processing proceeds to operation 460 where the update buffer is flushed and the values for the active keys are added to the update buffer. The update buffer may reside in memory or any suitable storage device including database 40. Once operation 460 has completed or it is determined in operation 450 that the active keys are not changed then processing proceeds to operation 470. In operation, 470 the data server thread 100 determines if any updates are pending. If updates are pending then processing proceeds to operation 480 where an update packet is created and sent to the user terminal 10. In this manner, only values that have changed are sent to the user terminal 10 and the volume of data is kept to a minimum. Once the packet is sent to the user terminal 10, processing proceeds back to operation 430 where the succeeding operations are repeated.

Still referring to FIG. 7, if it is determined in operation 480 that no updates are pending then processing proceeds to operation 490 where it is determined if an update notification has been received from the source filter module 140 through the hash table 130. Such an update notification would indicate that a value to a monitored key has changed and the user terminal 10 may need to be updated. If operation 490 determines that no update notification has been received then processing proceeds back to operation 430 where the succeeding processes are repeated. However, if operation 490 determines an update notification was received then processing proceeds to operation 500 where it is determined if the key with which this update notification is associated with is currently active. If the key is not currently active then there exists no need to update the user terminal 10 and processing again returns to operation 430. However, if the key is currently active then processing proceeds to operation 510 where the update value is added to the update buffer where it will be transmitted to the user terminal in operation 480.

Figure 8:
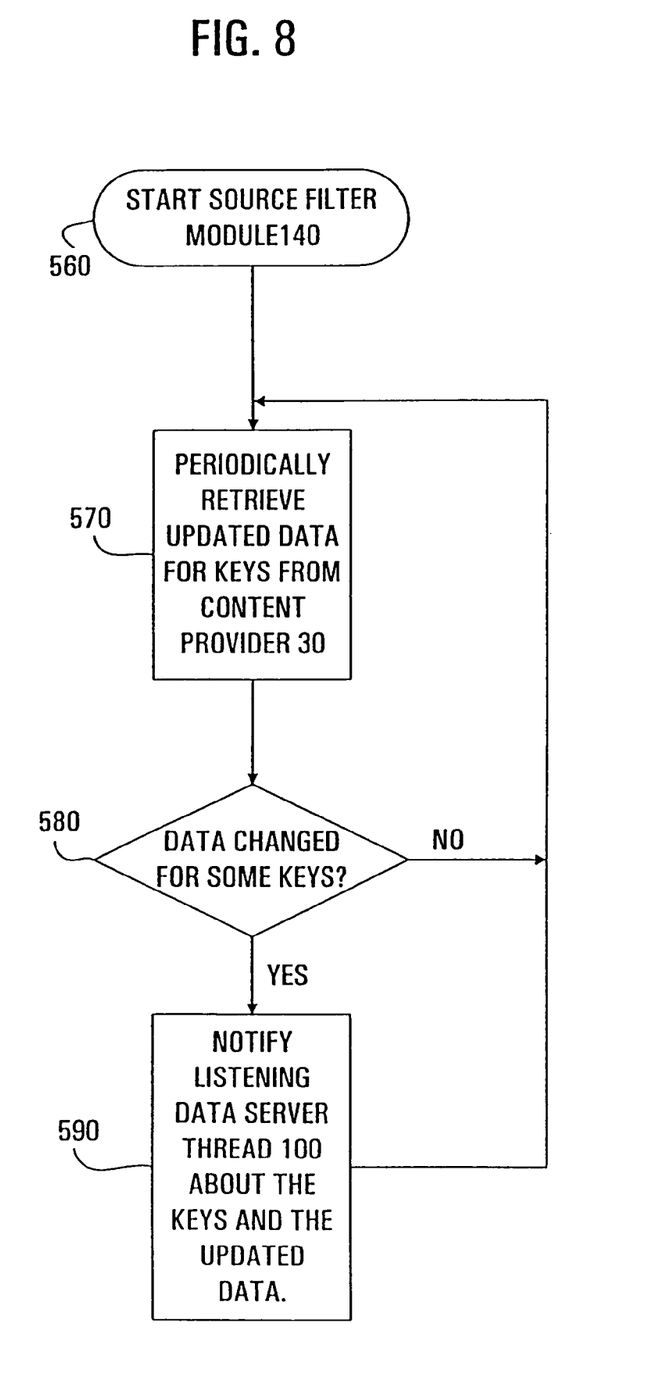
FIG. 8 is an example flowchart illustrating the operations performed by the source filter module 140 contained in the source filter server module 60 shown in FIG. 2.

FIG. 8 is an example flowchart illustrating the operations performed by the source filter module 140 contained in the source filter server module 60 shown in FIG. 2. The source filter server module 60 is activated upon startup of the server 20 and creates a separate source filter module 140 for each content provider to which the server 20 is connected. The source filter module 140 is activated in operation 560 and processing immediately proceeds to operation 570. In operation 570, the source filter module 140, on a periodic or predetermined time basis, retrieves key data from the content provider 30. For example, every few seconds the source filter module 140 could retrieve the last trading price for every stock listed on a content provider 30 such as the New York Stock Exchange. Then in operation 580, the source filter module 140 determines if any of the data associated with the keys in the hash table 130 has changed. If no values for any keys have changed, then processing branches back to operation 570 and repeats again. However, if a value for a key has changed the data server thread 100 that is listening for updates is notified of the change in the value of data associated with the key. Thereafter, processing proceeds back to operation 570 and repeats until the server 20 is shutdown.

Figure 9:
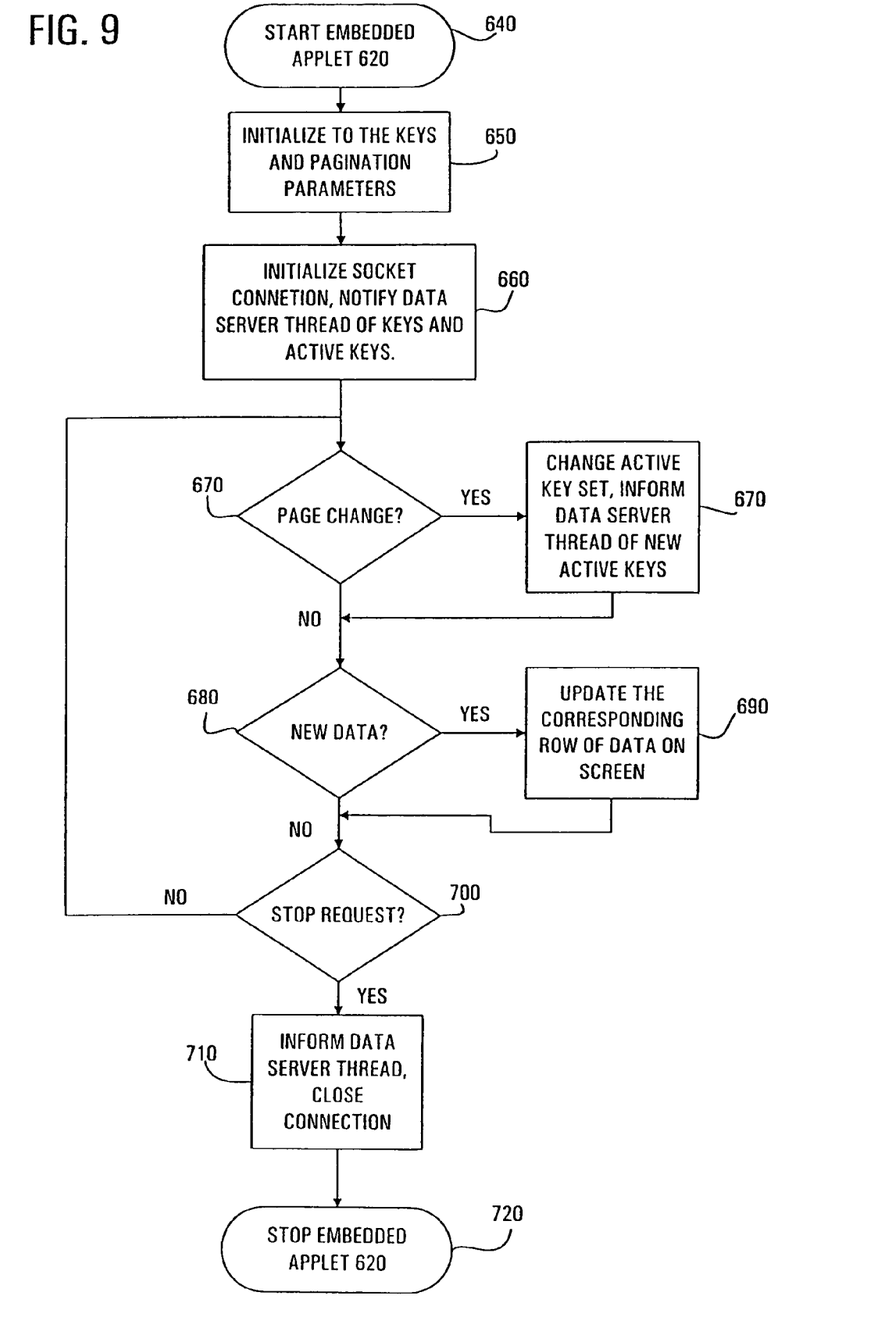
FIG. 9 is an example flowchart illustrating the operations performed by the embedded applet 620 contained in the user terminal 160 shown in FIG. 3.

FIG. 9 is an example flowchart illustrating the operations performed by the embedded applet 620 contained in the user terminal 10 shown in FIG. 3. The embedded applet 620 is generated by web engine server module in conjunction with the pagination engine module 90 in operation 330 shown in FIG. 6. Upon activation of the embedded applet 620 in operation 640, processing immediately proceeds to operation 650 where the keys and pagination parameters are initialized. Thereafter, in operation 660, the socket connection is initialized and the associated data server thread 100 is notified of the keys and those that are active. In operation 670, a determination is made whether a page change is needed. Such a page change would be needed when a user enters commands to monitor a different portfolio, a different stock or set of stocks, or a different event. If such a page change is needed then processing proceeds to operation 670 where the active key set is changed and the data server thread 100 is informed of the change in the page.

Regardless of whether a page change is required processing for the embedded applet 620 proceeds to operation where a determination is made as to whether new data has been received from the data server thread 100 as a result of a change is an active key. If new data has been received then processing proceeds to operation 690 where the corresponding row on the screen of the user terminal 10 is updated. Examples of screens displayed on the user terminal are provided in FIGS. 11 and 12.

Whether any new data was received, processing continues to operation 700 where it is determined whether a stop request has been entered by the user on the user terminal 10. If such a stop request has not been entered, then processing proceeds back to operation 670 and repeats. However, if a stop request has been received then processing proceeds operation 710 where the data server thread 100 is informed and the connection is closed. Thereafter, processing proceeds to operation 720 where the execution of the embedded applet 620 is terminated.

Figure 10:
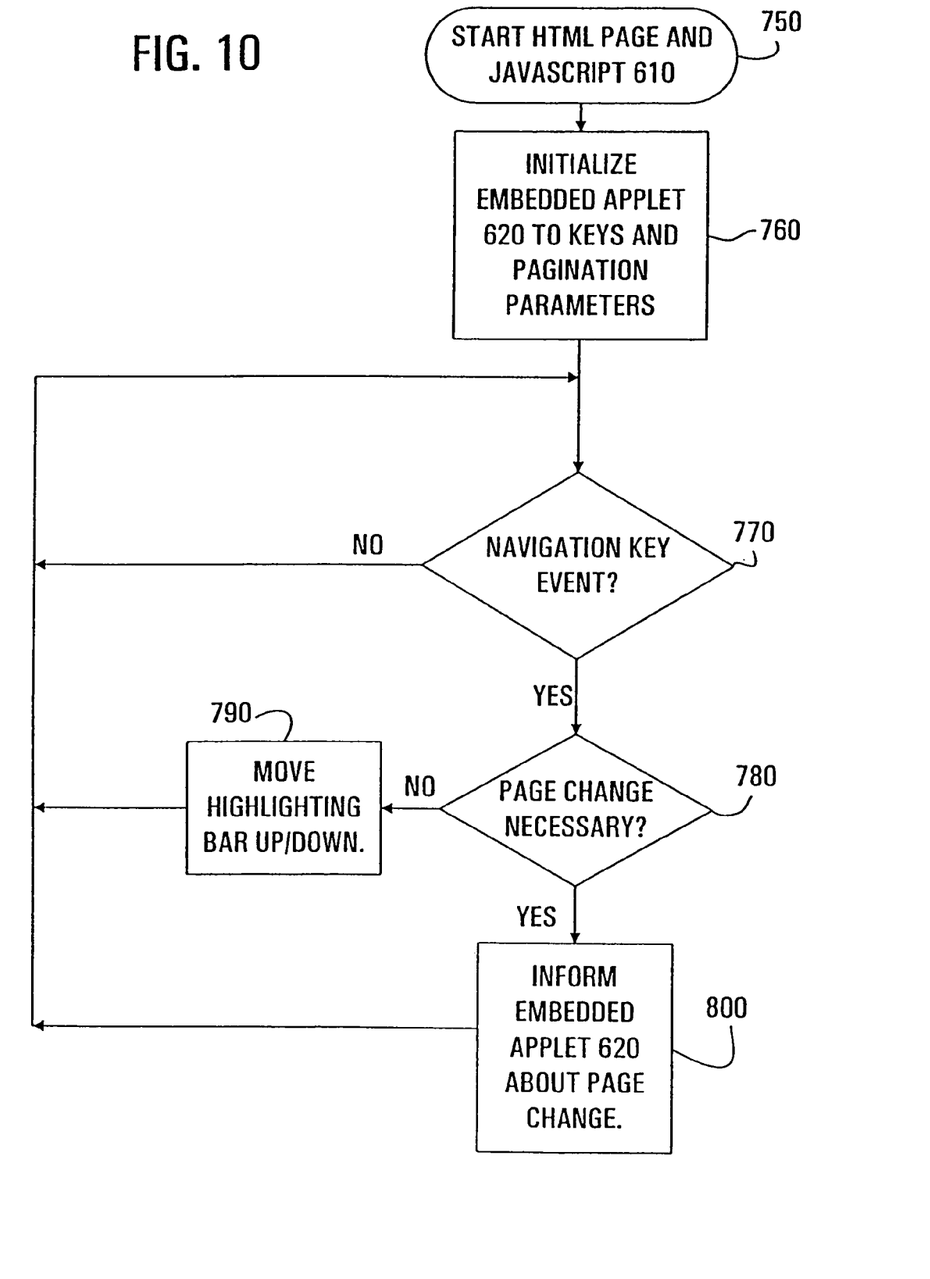
FIG. 10 is an example flowchart illustrating the operations performed by the HTML page and JavaScript 610 contained in the user terminal 10 shown in FIG. 3.

FIG. 10 is an example flowchart illustrating the operations performed by the HTML page and JavaScript 610 contained in the user terminal 10 shown in FIG. 3. The HTML page and JavaScript 610 is generated by web engine server module 50 in conjunction with the pagination engine module 90 in operation 330 and 340 shown in FIG. 6. Upon activation of the HTML page and JavaScript 610 in operation 750, processing immediately proceeds to operation 760 where the keys and pagination parameters are initialized. Thereafter, in operation 770 a determination is made if a navigation event has occurred. A navigation event is an event caused by the user that would require some change to occur such as, but not limited to the selecting of a menu bar or the request for a new piece of data to be displayed. If it is determined in operation 770 that a navigation event has not occurred then processing enters a loop process wherein the HTML page and JavaScript 610 branches back to operation 770 until such a navigation event is detected. If a navigation event is detected then processing proceeds to operation 780 where it is determined if a page change is necessary. If such a page change is not desired then processing proceeds to operation 790 in order to place a highlighted bar on the screen and allow the user to move it and make a selection. Examples of such highlighted bars may be found illustrated in the example screens found FIGS. 11 and 12. If a page change is necessary due to a user selection, then processing proceeds to operation 800 where the embedded applet 620 is informed of the page change. Thereafter, HTML page and JavaScript 610 continues to loop back to operation 770 where it repeats processing until the user moves out of the portfolio page, thereby halting the monitoring of real-time values and causing the embedded applet 620 to stop execution.

Figure 11:
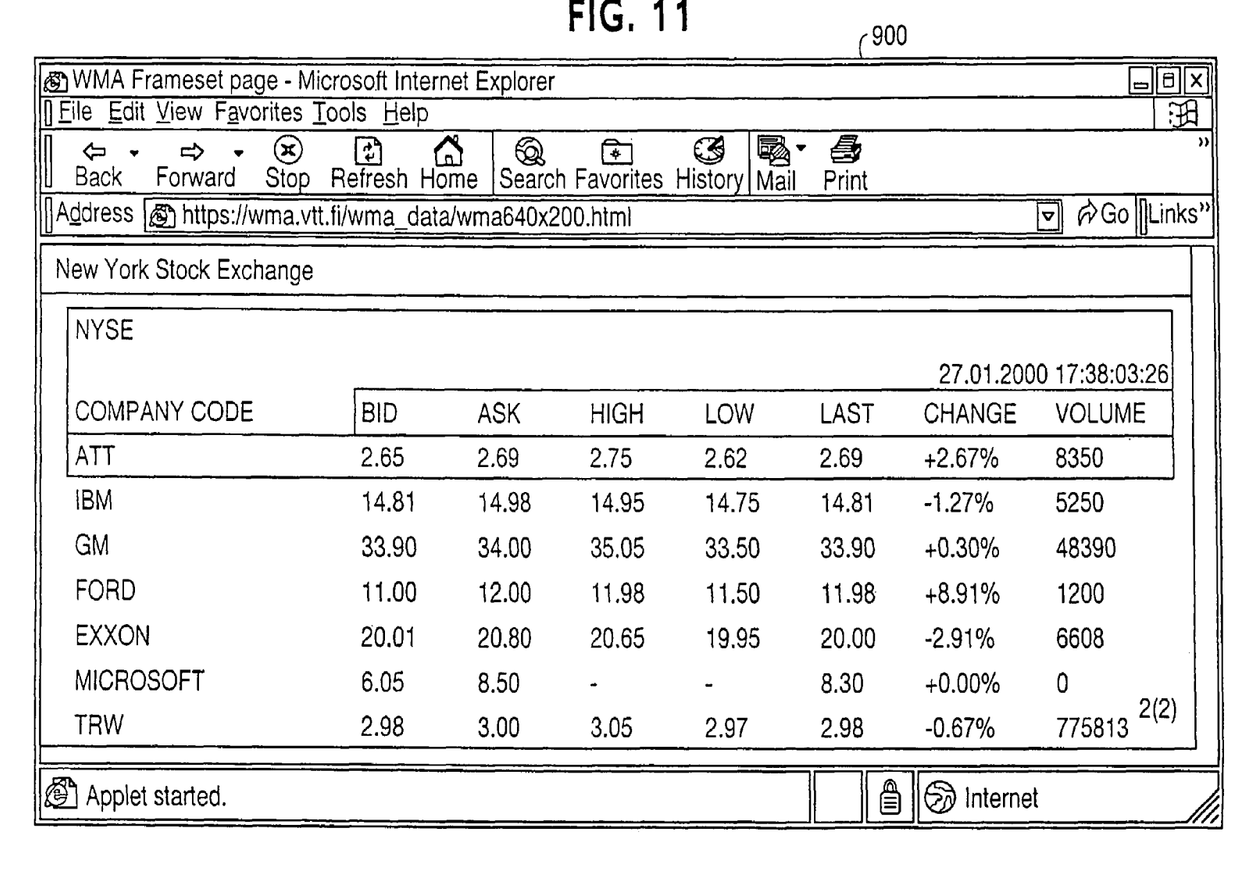
FIG. 11 is an example screen generated by the embodiments of the present invention.

FIG. 11 is an example screen 900 generated by the embodiments of the present invention in which stock data is shown as displayed on user terminal 10. Screen 900 shows an example stock portfolio selected by a user when employing the embodiments of the present invention. The example screen 900 shown in FIG. 11 is provided to illustrate a user portfolio of stocks and market data related to the stocks as would be shown in a typical screen size.

Figure 12:
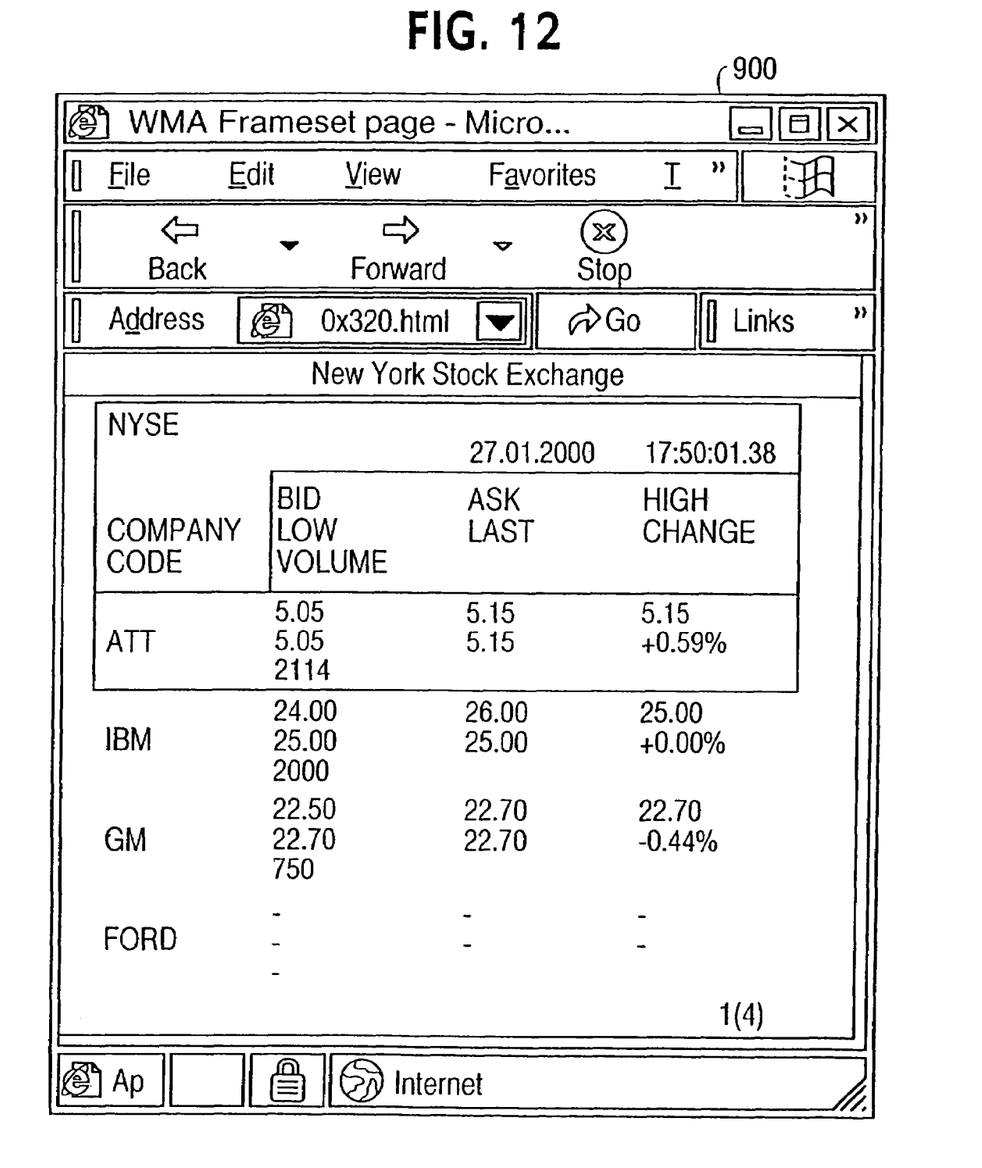
FIG. 12 is an example screen generated by the embodiments of the present invention.

FIG. 12 is an example screen 900 generated by the embodiment of present invention showing stock prices on a smaller screen such as may be used in WAP-capable cellular telephone or a palm computer. As can be seen in FIG. 12, the volume of data in screen size is adjusted in order to accommodate smaller display area.

Using the foregoing embodiments of the present invention, a user is able to receive rapidly changing real-time data over a relatively slow communications line and view this data on a relatively small screen such as found in a WAP-capable phone. This is possible due to the embodiments of the present invention being able to maintain a low volume of traffic throughput over the communications line. This is possible since only data that has changed is transmitted and not the entire screen. A hash table is used to identify real time data values that have changed and only those real-time data values that are associated with active keys are transmitted to the user terminal. Screens of various sizes may be identified and compensated for by using a table associated with each screen size. Further, an entire screen of data is only transmitted once upon start up and thereafter only real-time data values that have changed are transmitted.

While we have shown and described only a few examples herein, it is understood that numerous changes and modifications as known to those skilled in the art could be made to the present invention. For example, any type of real-time data may be retrieved and transmitted to users on a selective basis. The embodiments present invention are not confined to stock prices. Further, any type of direct method of record retrieval may be utilized instead of hash table 130. Therefore, we do not wish to be limited to the details shown and described herein, but intend to cover all such changes modifications as are encompassed by the scope of the appended claims.

We claim:

1. A method comprising:
   receiving information at a content server from at least one content provider;
   storing at least one portion of the information;
   sending the at least one portion of the information to a user terminal for display on the user terminal;
   receiving, from an embedded applet in a remote mobile terminal, notification of active keys associated with a current display of the at least one portion of the information on the user terminal, wherein the notification is indicative of a change of an active key set when a page change occurs;
   receiving additional information at the content server, the additional information including a later version of the at least one portion of the information;
   identifying changed information parts by determining one or more differences between the later version of the at least one portion of the information and the stored at least one portion of the information;
   updating stored at least one portion of the information based on the changed information parts; and
   transmitting the changed information parts associated with the active keys to the embedded applet in the user terminal without also transmitting unchanged parts of the stored at least one portion of the information.

2. The method recited in claim 1, wherein the received information comprises a plurality of real-time data values.

3. The method recited in claim 2, wherein the received additional information comprises an additional plurality of real-time data values, and wherein the updating further comprises:
   accessing a hash table containing the plurality of real-time data values using a plurality of keys associated with the plurality of real-time data values;
   determining whether the additional plurality of real-time data values includes changes from the plurality of real-time data values contained in the hash table; and
   updating the prior values of the plurality real-time data values contained in the hash table using values of the additional plurality of real-time data values that reflect determined changes.

4. The method recited in claim 3, wherein the transmitting comprises:
   activating a data thread when a value of the plurality of real-time data values is updated in the hash table;
   determining a position on a screen of the user terminal corresponding to the updated value in the hash table;
   transmitting the updated value in the hash table to the user terminal for display on the screen of the user terminal in the position determined.

5. The method recited in claim 4, wherein the activating step comprises activating the data thread using remote method invocation.

6. The method recited in claim 3, further comprising:
   spawning a data server thread in response to receiving a connection request from the user terminal;
   retrieving, by the data server thread, a user defined portfolio containing a plurality of keys;
   generating an activated HTML page containing the embedded applet and sending the activated HTML page to the user terminal;
   monitoring the plurality of keys contained in the user defined portfolio; and
   identifying new active keys of said of the plurality of keys from the embedded applet.

7. The method recited in claim 6, comprising:
   determining that a shutdown request has been made; and
   disconnecting all connections to the user terminal in response to determining the shutdown request was made.

8. The method recited in claim 7, comprising:
   retrieving real-time data values on a periodic basis.

9. The method recited in claim 8, comprising:
   notifying the data server thread when a received real-time data value reflects a change over a previously received real-time data value.

10. The method recited in claim 6, comprising:
    determining whether the page change is required;
    receiving, by the data server thread, a plurality of new active keys; and
    transmitting the additional plurality of real-time data values to the user terminal through the data server thread using the new active keys.

11. A computer-readable medium having computer-executable instructions comprising:
    a real-time data server code segment configured to receive real-time data values from at least one content provider, receive active keys that are associated with at least one portion of information currently displayed on a user terminal and when a page change occurs receive a change of an active key set from an embedded applet in the user terminal, determine changed data values by identifying one or more differences between the received real-time data values and prior real-time data values, and transmit one or more of the changed data values associated with one or more of the active keys to the embedded applet without also transmitting unchanged data values to the user terminal when any of the real-time data values associated with the one or more of the active keys has changed.

12. The computer-readable medium of claim 11, wherein the real-time data server code segment further comprises:
instructions executable to store the prior real-time data values in a hash table and update the stored prior real-time data values with the changed data values.

13. The computer-readable medium of claim 12, wherein the real-time data server code segment further comprises:
a web engine server module code segment to access a database having a portfolio generated by a user and generate an HTML page and the embedded applet, wherein upon receipt of a connection request from the user terminal the web engine server module code segment downloads the HTML page and the embedded applet to the user terminal.

14. The computer-readable medium of claim 12, wherein the real-time data server code segment further comprises:
a source filter server module code segment to receive the real-time data values, determine if the real-time data values reflect changes from stored prior real-time data values, and activate a data thread code segment when a real-time data reflects a change from a stored prior real-time data value.

15. The computer-readable medium of claim 14, wherein the real-time data server code segment further comprises:
executable instructions to communicate to the user terminal from the source filter server module code segment through the data thread code segment.

16. The computer-readable medium of claim 14 wherein:
the source filter server module code segment includes instructions executable to update the hash table based on the received real-time values.

17. The computer-readable medium of claim 12 further comprising:
a web server module code segment to communicate to the user terminal and retrieve a portfolio specified from a database; and
a pagination engine module code segment, in communication with the web server module code segment, to create an HTML page and applet code segment based on the portfolio selected and the size of a screen on a user terminal.

18. An apparatus comprising:
a processor; and
a memory having stored therein machine executable instructions, that when executed, cause the apparatus to:
receive data from a real-time content provider, and store the received data in a keyed hash table;
establish a data server thread connection with a remote mobile terminal;
perform operations either when a data server thread connection receives an active key request from an embedded applet in the remote mobile terminal that is indicative of a change of an active key set for a page change and or when new data is received to update the remote mobile terminal through the embedded applet, the operations including a) querying a keyed hash table for corresponding data; b) determining whether the queried data differs from data currently displayed on the remote mobile terminal; c) sending the queried data to the remote mobile terminal when the queried data differs from the data currently displayed on the remote mobile terminal; and d) not sending the queried data to the remote mobile terminal when the queried data does not differ from the data currently displayed on the remote mobile terminal; and
communicate formatted data to the remote mobile terminal based on the queried data.

19. The apparatus of claim 18, wherein the executable instructions further cause the apparatus to:
access the keyed hash table containing a plurality of prior real-time data values using a plurality of keys associated with a plurality of later real-time data values;
determine whether the plurality of later real-time data values includes changes over the prior plurality of real-time data values contained in the keyed hash table; and
update the prior plurality real-time data values contained in the keyed hash table based on the determined changes.

20. The apparatus of claim 19, wherein the executable instructions further cause the apparatus to:
retrieve a portfolio selected by a user;
generate an activated HTML page containing the embedded applet for the portfolio; and
download the activated HTML page to the remote mobile terminal.

21. The apparatus of claim 19, wherein the executable instructions further cause the apparatus to:
monitor the plurality of keys; and
identify currently active keys of said plurality of keys.

22. The apparatus of claim 21, wherein the executable instructions further cause the apparatus to:
read the currently active keys;
determine if the currently active keys have changed;
update the keyed hash table with real-time data values for the currently active keys; and
download the updated real-time values for the currently active keys to the remote mobile terminal.

23. The apparatus of claim 22, wherein the executable instructions further cause the apparatus to:
determine whether a shutdown request was made; and
disconnect all connections to the remote mobile terminal in response to the shutdown request.

* * * * *